Feb. 7, 1928. 1,658,045

G. H. FREW, JR., ET AL

AUTOMATIC REVERSING MECHANISM FOR TAPPING MACHINES

Filed Feb. 3, 1926 2 Sheets-Sheet 1

Feb. 7, 1928.　　　　　　　　　　　　　　1,658,045
G. H. FREW, JR., ET AL
AUTOMATIC REVERSING MECHANISM FOR TAPPING MACHINES
Filed Feb. 3, 1926　　　　2 Sheets-Sheet 2

Patented Feb. 7, 1928.

1,658,045

UNITED STATES PATENT OFFICE.

GEORGE H. FREW, JR., OF PALISADE, NEW JERSEY, AND OSCAR W. NILSON, OF PHILADELPHIA, PENNSYLVANIA, ASSIGNORS TO GEORGE H. FREW, JR., OF PALISADE, NEW JERSEY.

AUTOMATIC REVERSING MECHANISM FOR TAPPING MACHINES.

Application filed February 2, 1926. Serial No. 85,696.

This invention relates to the automatic reversing mechanism for a tapping machine.

In power tapping machines the reversing mechanism must function promptly when the predetermined depth is reached. It must be capable of accurate setting which setting should be easily done. It must be readily adjustable for wear and of simple design. It must be rugged and not subject to breakdowns.

The objects of this invention are to provide an automatic reversing mechanism for power tapping machines that is easily, quickly and accurately set; that is easy and accurate of operation; of simple design having few parts, rugged but capable of ready adjustment should wear take place.

Referring to the drawings.

Figure 1:
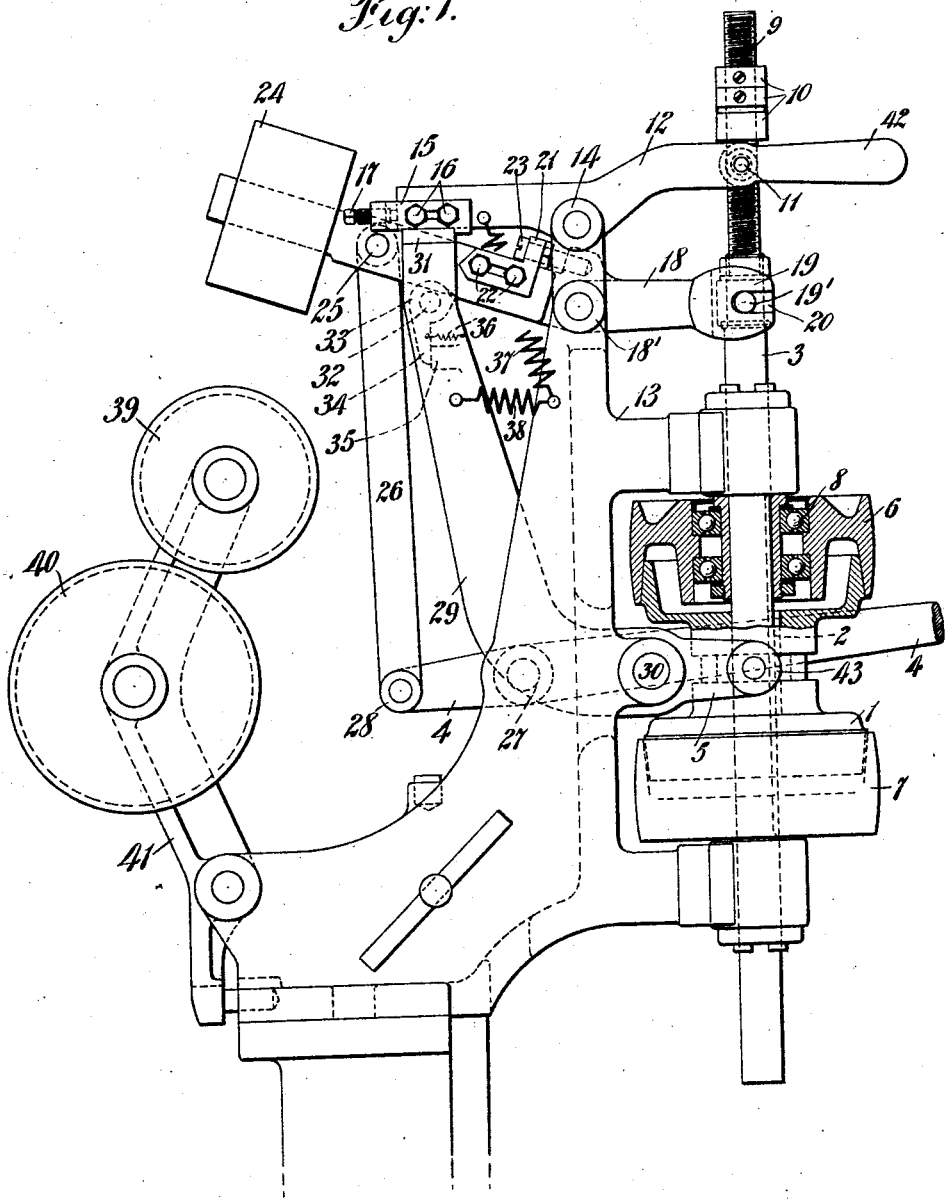
Figure 1 is a view in side elevation, partly in section, showing the device in tapping position.
Figure 2:
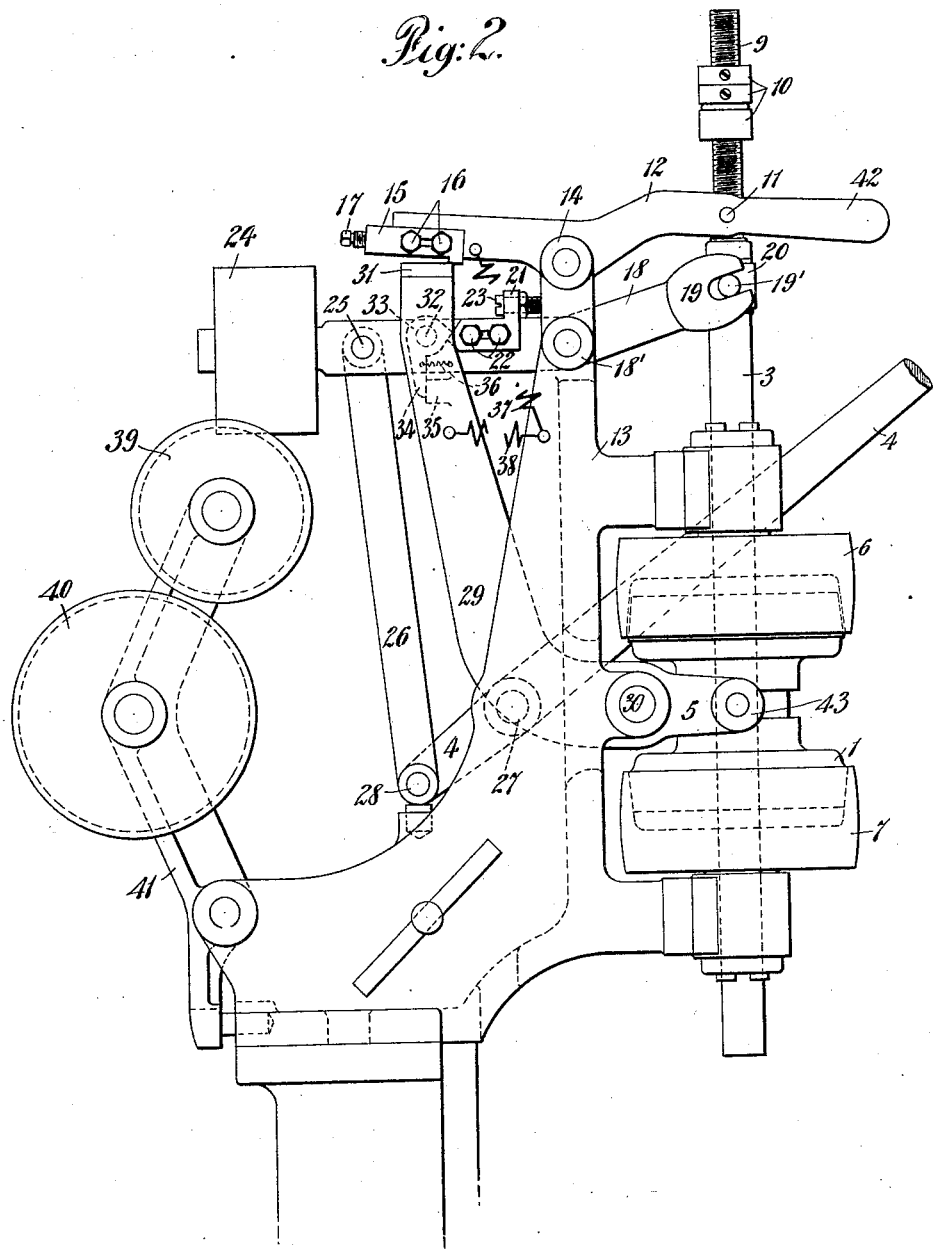
Figure 2 is a view in side elevation showing the device in reversing position.

In carrying out our invention we propose to provide a double end and double faced clutch 1, keyed by key 2 to spindle 3. Clutch 1 is shifted by yoke 5 of lever 29. Pulleys 6 and 7 are journaled on spindle 3. Pulley 6 is the tapping pulley or driving pulley and pulley 7 is the reversing pulley. The latter pulley may be of greater diameter to provide for an increased reversing speed. Pulleys 6 and 7 have the usual bearings 8. Spindle 3 at its upper end is screw threaded at 9 and carries adjustable screw stop 10. Below screw stop 10 is hardened roller or trip 11 on lever 12. Pivoted at 14 to frame 13 is lever 12 and beyond at the end of lever 12 is trip block 15 of hardened steel secured by bolts 16 to lever 12. Trip block 15 is slotted to receive bolts 16 and to permit of adjustment by adjustment set screw 17. Lever 18 is pivoted at 18′ to frame 13 and one end terminates in a claw 19 co-operating with pin 19′ carried by collar 20 secured to spindle 3. Adjacent pivot 18′ on lever 18, is cam block 21 secured by bolts 22 and having adjustment set screw 23. An adjustable counterbalance weight 24 is secured to the other end of lever 18. Between weight 24 and cam block 21, lever 18 is pivoted at 25 to toggle lever 26. Hand lever 4 is pivotally connected at 27 to frame 13 and at 28 to lever 26. Bent arm lever 29 is pivotally connected at its lower end at 30 to frame 13 and at 43 through yoke 5 to clutch 1, and at its other end carries a hardened face block 31 which co-operates with trip block 15. The latter rides on it or snaps over it. Pivoted at 32, below face block 31, on lever 29 is cam 33. Stop arm 34 is integral with cam 33 to prevent counter-clockwise rotation as it abuts surface 35 on lever 29. Spring 36 holds arm 34 in normal contacting engagement with surface 35 and returns it to such engagement when cam 33 is rocked by cam block 21 in clockwise direction. Springs 37 and 38 are secured at one end to frame 13 and at the other end to levers 29 and 12 respectively, to maintain frictional engagement of face block 31 and trip block 15. Belt guide rollers 39 and 40 are supported by arm 41 carried by frame 13. The operation of the device is as follows:

After the tap is set up in the machine and the work to be tapped is placed on the table of the machine in any form of jig or fixture, the operator pulls down on hand lever 4 which raises the rear end of lever 18 and lowers the forward end, thus pushing down spindle 3 carrying the tap. As lever 18 commences to move, cam block 21 pushes against cam 33 on lever 29. As the motion continues, lever 29 is pushed back until clutch 1 moves from engagement with pulley 7 and enters engagement with pulley 6 changing the direction of rotation to forward or tapping rotation. When lever 29 has been pushed back sufficiently, trip block 15 on lever 12 drops over the edge of face block 31 and is held in locked position by springs 38, 37, as shown in Figure 1. As the tap progresses through the article being tapped, screw stop 10 carried by spindle 3 travels lower and lower until at the predetermined time it strikes hardened roller or trip 11 on lever 12, causing lever 12 to pivot about its pivot 14 raising the rear end and disengaging trip block 15 from face block 31, causing trip block 15 to ride on face block 31. Arm 29 rocks about its pivot causing clutch 1 to engage reversing pulley 7. As lever 18 arrives at its original position cam block 21 tilts cam 33 which is free to move in clockwise rotation to permit cam block 21 to pass cam 33. The cam 33 is returned to its original position by spring 36.

Although the mechanism has been shown on a vertical tapping machine it is adapted to be used on a horizontal tapping machine and is further adapted to other uses such as a stud setting machine. For that purpose, we provide a handle 42 on lever 12 to permit of manual tripping. Various changes in the construction of the device might be made and still fall within the scope of our invention and claims.

It will thus be seen that we have invented a reversing mechanism of few parts easily adjustable for wear, capable of accurate setting and easy and quick operation.

What we claim is:

1. A mechanism comprising a clutch lever, a clutch secured to said lever, a series of pivotally connected levers, an adjustable cam block carried by one of the said pivotally connected levers, a cam co-operating with said cam block and carried by said clutch lever to rock said clutch lever, means for maintaining said clutch lever in rocked position, an adjustable trip to actuate said maintaining means and operable at a predetermined time to release said maintaining means and means to rock said clutch lever to initial position.

2. In a mechanism, a spindle, a double end clutch adapted to rotate said spindle, means for rotating said clutch in either of two opposite directions, a clutch lever, a cam free to rock in a clockwise direction and carried by said clutch lever, means co-operating with said cam for rocking said lever and shifting said clutch, a trip block for maintaining said rocked clutch lever and clutch in operating position, means for predetermined tripping of said trip block and means for rocking said clutch lever to reverse the direction of rotation of said clutch.

3. In a mechanism, a spindle, a clutch to rotate said spindle in either of two opposite directions, means for rotating said clutch, a clutch lever, a manual operable starting lever, a counterweighted lever connected to said spindle at one end, links pivotally connecting said manual lever to said counterweighted lever, a cam carried by said clutch lever, said cam free to rock in one direction, a cam block carried by said counterweighted lever and co-operating with said cam to rock said clutch lever and shift said clutch to operating position, a latch for maintaining said clutch lever and clutch in operating position, means for predetermined tripping of said latch, and means for rocking said clutch lever to shift said clutch to reversing position.

4. In a mechanism, a spindle, a clutch to rotate said spindle in either of two opposite directions, means for rotating said clutch, a clutch lever, means for rocking said clutch lever and shifting said clutch, a trip lever, an adjustable block having a seat therein and secured to one end of said trip lever to lock said clutch lever in operating position when rocked by said clutch rocking means, a face block carried by the free end of said clutch lever and adapted to seat in said adjustable block, a spring to maintain said block and face plate in contactual locking relationship, means for predetermined tripping of said trip lever to unseat said face block from said adjustable block and means to rock said clutch lever and shift said clutch lever to reversing position when said face block is unseated from said adjustable block.

Signed at Philadelphia in the county of Philadelphia and State of Pennsylvania this first day of February A. D. 1926.

OSCAR W. NILSON.
GEORGE H. FREW, Jr.